United States Patent
Lee et al.

(10) Patent No.: US 8,438,629 B2
(45) Date of Patent: May 7, 2013

(54) PACKET SECURITY METHOD AND APPARATUS

(75) Inventors: Yung-ji Lee, Suwon-si (KR); Kyung-hee Lee, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 904 days.

(21) Appl. No.: 11/356,138

(22) Filed: Feb. 17, 2006

(65) Prior Publication Data
US 2006/0191002 A1    Aug. 24, 2006

(30) Foreign Application Priority Data

Feb. 21, 2005 (KR) .......... 10-2005-0014173
Nov. 14, 2005 (KR) .......... 10-2005-0108639

(51) Int. Cl.
  G06F 21/00 (2006.01)
(52) U.S. Cl.
  USPC ...... 726/13; 726/4; 726/14; 726/27; 713/160; 713/161; 713/166
(58) Field of Classification Search .......... 713/153, 713/160, 161, 190, 166; 380/28; 726/13–14, 726/4, 27
  See application file for complete search history.

(56) References Cited

U.S. PATENT DOCUMENTS

| | | | | |
|---|---|---|---|---|
| 6,108,583 | A * | 8/2000 | Schneck et al. | 700/9 |
| 6,889,321 | B1 * | 5/2005 | Kung et al. | 713/153 |
| 6,952,778 | B1 * | 10/2005 | Snyder | 726/4 |
| 7,149,896 | B1 * | 12/2006 | Bahl et al. | 713/166 |
| 7,257,843 | B2 * | 8/2007 | Fujita et al. | 726/27 |
| 7,454,610 | B2 * | 11/2008 | Buer et al. | 713/153 |
| 2004/0064688 | A1 * | 4/2004 | Jacobs | 713/150 |
| 2004/0128553 | A1 | 7/2004 | Buer et al. | |
| 2004/0139339 | A1 * | 7/2004 | Yeh et al. | 713/193 |
| 2004/0143734 | A1 * | 7/2004 | Buer et al. | 713/153 |
| 2004/0193871 | A1 * | 9/2004 | Seshadri | 713/154 |
| 2004/0223615 | A1 * | 11/2004 | Dhawan | 380/261 |

FOREIGN PATENT DOCUMENTS

| | | |
|---|---|---|
| KR | 1020010098513 A | 11/2001 |
| KR | 1020040038168 A | 5/2004 |

OTHER PUBLICATIONS

Communication issued Apr. 1, 2011 in counterpart Korean Application No. 10-2005-0108639.
Communication dated Oct. 24, 2011 issued by the Korean Intellectual Property Office in counterpart Korean Patent Application No. 10-2005-0108639.

* cited by examiner

*Primary Examiner* — Jeffrey Pwu
*Assistant Examiner* — Helai Salehi
(74) *Attorney, Agent, or Firm* — Sughrue Mion, PLLC

(57) ABSTRACT

A packet security method and apparatus adjusts a security level of the packet according to a feature of the packet. The packet security method includes detecting a feature of a packet to be transmitted, determining a security level of the packet according to the detected feature, and generating a security packet according to the determined security level. The feature of the packet is at least one of a destination address of the packet, a transfer protocol of the packet, a packet size, an application for the packet, and a designated security level for the packet. According to the method, the security function is adoptively applied according to the feature of the packet being transmitted, and thus flexibility can be provided in the application of the security function to achieve an efficient use of resources.

13 Claims, 3 Drawing Sheets

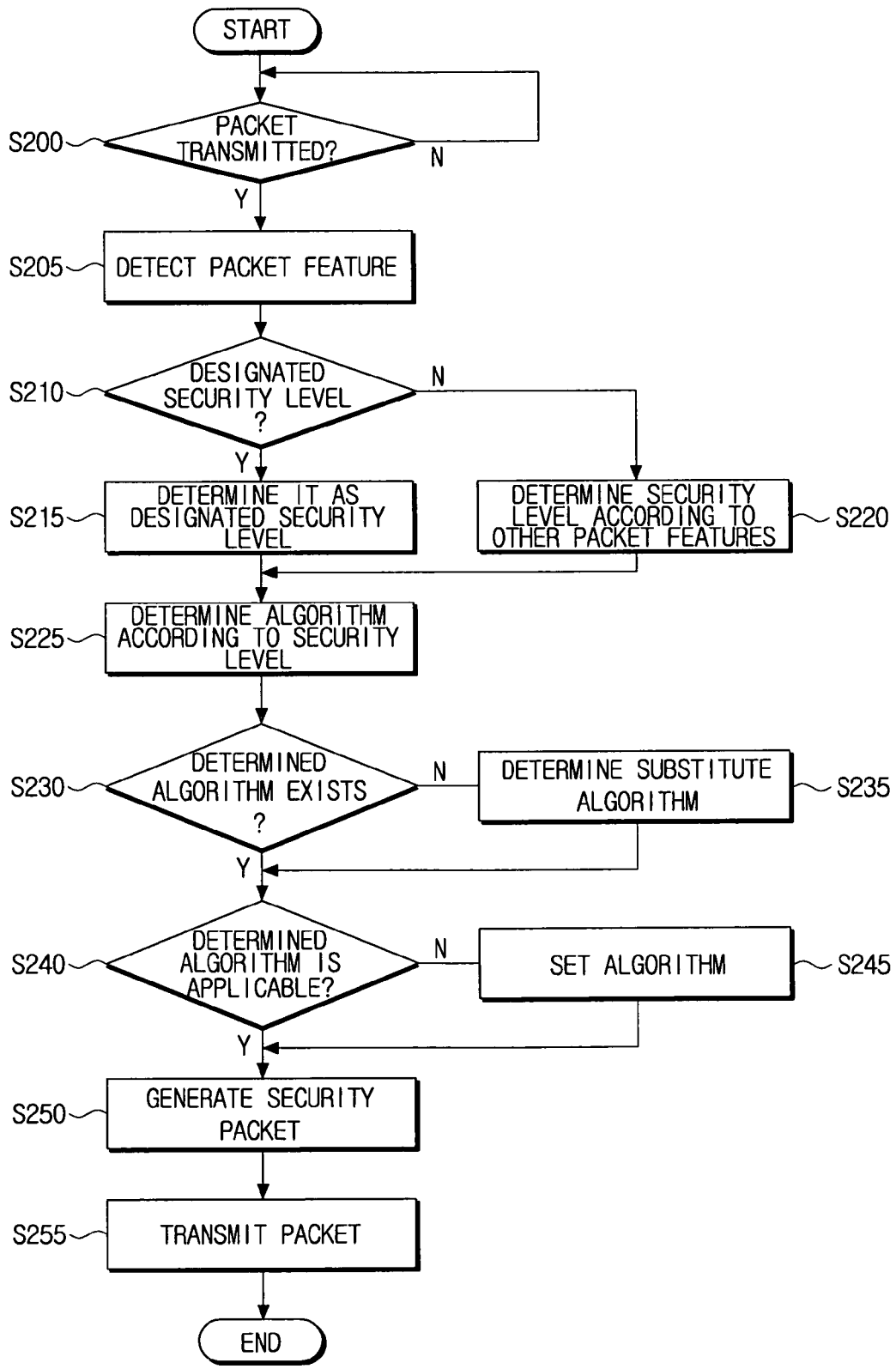

PACKET SECURITY METHOD AND APPARATUS

This application claims benefit under 35 U.S.C. §119 from Korean Patent Application Nos. 2005-14173 filed on Feb. 21, 2005, and 2005-108639 filed on Nov. 14, 2005, the entire content of which is incorporated herein by reference.

BACKGROUND OF THE INVENTION

1. Field of the Invention

An apparatus and method consistent with the invention relates to packet security, and more particularly, to a packet security method and apparatus that can adjust a security level according to a packet feature.

2. Description of the Related Art

A major issue that has arisen from the use of an open network such as the Internet is a security problem in which a hacker intrudes into a system from outside the system, or illegally accesses the system by pretending to be a third party.

Internet Protocol Security (IPSec) and Secure Socket Layer (SSL) are used representatively to solve this Internet security problem.

IPSec encrypts data to enable both devices to communicate with each other safely, due to the expansion of the Internet standard for authentication and encryption at an IP layer. Both devices communicating via IPSec first share security information by performing a security association which associates a key with authentication and encryption algorithms through Internet key exchange (IKE), and then apply a security function to data that is transmitted according to the information to transmit the data with the security function.

SSL encrypts data to secure safe communications between both devices at a presentation layer, determines a key and an algorithm to be used between both devices through a handshake protocol, and then uses values of the key and the algorithm in the communications between both devices.

According to the conventional security technology, only a key and an algorithm are applied to a device, irrespective of features of the transmitted packet, and only a security function that is determined in the process of security association is applied to the device.

Since only a predetermined key, algorithm, and security function are applied to a device, without considering the type and features of a transmitted packet, as described above, an excessive security function may be applied to the device when in actuality only a lower level of security is required, which causes resources to be used inefficiently. By contrast, insufficient security may be applied to the device even though a high level of security is actually required.

SUMMARY OF THE INVENTION

Illustrative, non-limiting embodiments of the present invention overcome the above disadvantages and other disadvantages not described above associated with the conventional arrangement. Also, the present invention is not required to overcome the disadvantages described above, and an illustrative, non-limiting embodiment of the present invention may not overcome any of the problems described above. An aspect of the present invention is to provide a packet security method and apparatus that can adjust a security level according to a feature of the packet.

The foregoing and other objects and advantages are substantially realized by providing a packet security method, which comprises detecting a feature of a packet to be transmitted, determining a security level of the packet according to the detected feature, and generating a security packet according to the determined security level.

The feature of the packet may be at least one of a destination address of the packet, a transfer protocol of the packet, a packet size, an application for the packet, and a designated security level for the packet.

If the detected packet has more than one feature, the security level of the packet may be determined based on the respective features.

The packet security method may further comprise determining an algorithm that is used to encrypt the packet according to the determined security level.

The packet security method may further comprise setting a new algorithm suitable for the destination device of the packet if the determined algorithm is not suitable for a destination device of the packet.

The packet security method may further comprise setting a new algorithm applicable to the determined security level if the algorithm corresponding to the determined security level does not exist in a security tool database.

The packet security method may further comprise setting an algorithm corresponding to the determined security level if an algorithm corresponding to the determined security level does not exist in a security tool database.

The packet security method may further comprise determining the security level of the packet according to a predefined security policy if a predefined security policy exists.

The security level may be adjustable.

According to another aspect of the present invention, a packet security apparatus comprises a packet feature detecting unit for detecting a feature of a packet to be transmitted, a security level determining unit for determining a security level of the packet according to the detected feature, and a security level generating unit for generating a security packet according to the determined security level.

The feature of the packet may be at least one of a destination address of the packet, a transfer protocol of the packet, a packet size, an application for the packet, and a designated security level for the packet.

If the detected packet has more than one feature, the security level of the packet may be determined by following steps according to the respective features.

The security packet generating unit may determine an algorithm that is used to encrypt the packet according to the determined security level.

If the determined algorithm is not suitable for a destination device of the packet, the security packet generating unit may set a new algorithm suitable for the destination device of the packet.

If the algorithm corresponding to the determined security level does not exist in a security tool database, the security packet generating unit may set a new algorithm applicable to the determined security level.

If an algorithm corresponding to the determined security level does not exist in a security tool database, the security packet generating unit may set an algorithm corresponding to the determined security level.

If a predefined security policy exists, the security level of the packet may be determined according to the predefined security policy.

The security level may be adjustable.

BRIEF DESCRIPTION OF THE DRAWINGS

The above aspects and features of the present invention will be more apparent by describing certain embodiments of the present invention with reference to the accompanying drawings, in which:

FIG. 3 is a flowchart illustrating a packet security method according to an embodiment of the present invention.

DETAILED DESCRIPTION OF THE EXEMPLARY EMBODIMENTS

Figure 1:
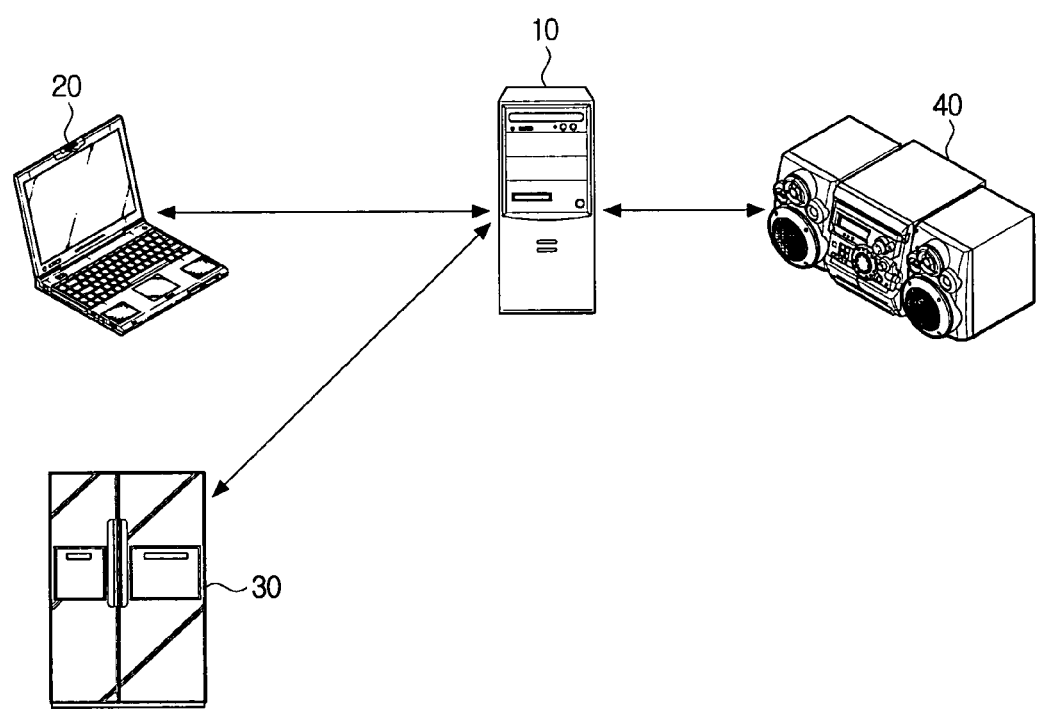
FIG. 1 is a view illustrating one example of a home network system comprising home devices and a home server to which a packet security apparatus according to an embodiment of the present invention is applied.

Certain embodiments of the present invention will be described in greater detail with reference to the accompanying drawings.

In the following description, the same drawing reference numerals are used to refer to the same elements even when appearing in different drawings. The matters described here, such as a detailed discussion of the construction of various devices and elements employed therein are provided to assist in a comprehensive understanding of the invention. Thus, it is apparent that the present invention can be carried out without employing those specific details. Also, well-known functions or constructions are not described in detail since their description would obscure the invention in unnecessary detail.

A security communication apparatus according to an embodiment of the present invention may be applied to devices which should transmit or receive data via an open network such as Internet, thereby providing packets transmitted by each device with a security function. An example in which the security communication apparatus according to an embodiment of the present invention is applied to home devices and a home server built in a home network system will now be described, for convenience of explanation.

FIG. 1 is a view illustrating one example of the home network system comprising home devices and a home server to which a packet security apparatus according to an embodiment of the present invention is applied. Referring to FIG. 1, the home network system is composed of home devices, such as a notebook computer 20, a refrigerator 30, and an audio equipment 40, which are digital devices operated via the Internet, and a home server 10 for managing/controlling the home devices. Information concerning an Internet protocol (IP) address, a device category, and a device ID, which are assigned to each home device so as to identify the home device, is registered in the home server 10.

Although FIG. 1 shows the home server 10 connected only to the notebook computer 20, the refrigerator 30, and the audio equipment 40, for clarity, the home server 10 may be connected to an information processing device such as a personal computer, a facsimile machine, a scanner, a printer, and the like, an A/V device such as a TV receiver, a set-top box, a DVD, a VCR, a camcorder, a game console, and the like, a consumer device such as a coffee maker, an electric cooker, a washing machine, a microwave oven, a camera, and the like, and a dummy device such as a remote controller, an intercom, a sensor, a light, and the like.

In order to make the home network composed of the home devices 20, 30, and 40 and the home server 10, reliable, the home devices 20, 30, and 40 must be authenticated, and a security function (i.e., encryption) is applied to data transmitted between the home devices 20, 30, and 40 and the home server 10. A security communication apparatus for implementing the security function according to the present invention may be provided to the home devices 20, 30, and 40 and the home server 10, respectively.

Figure 2:
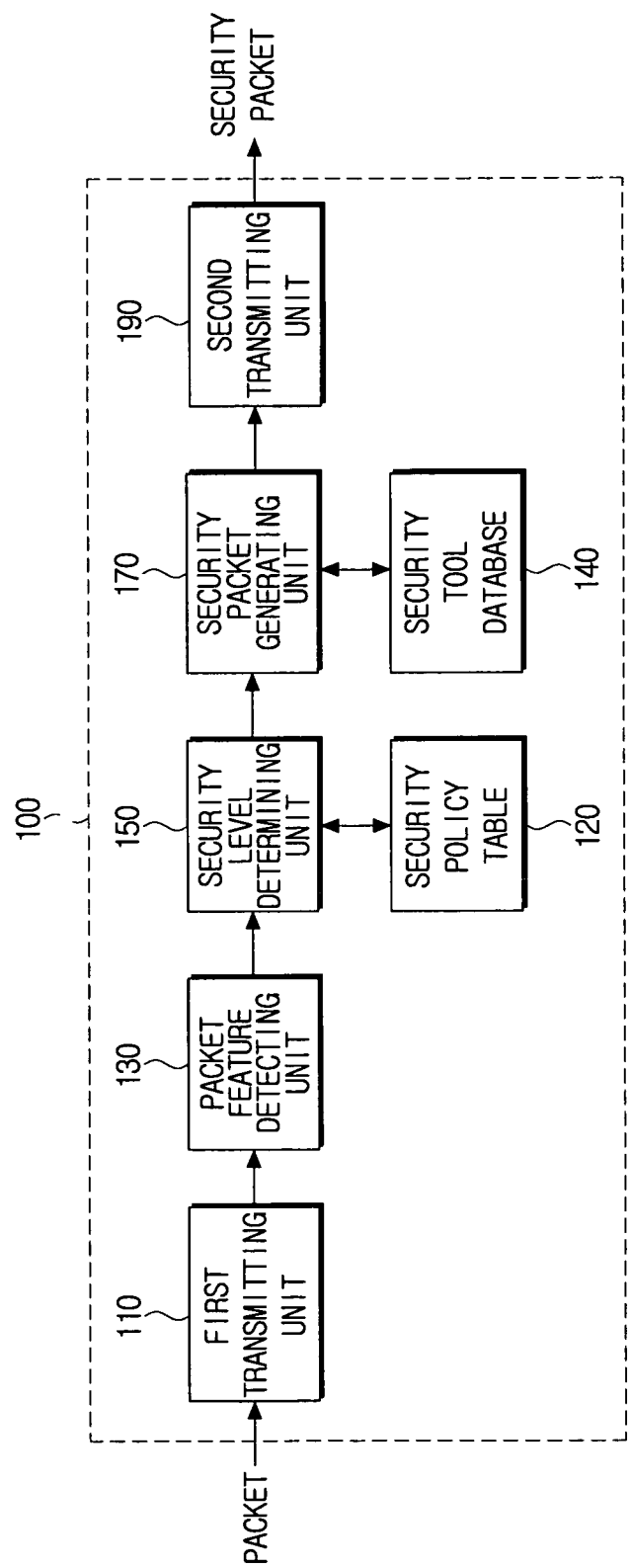
FIG. 2 is a block diagram schematically illustrating a packet security apparatus according to an embodiment of the present invention.

FIG. 2 is a block diagram schematically illustrating a packet security apparatus according to an embodiment of the present invention. Referring to FIG. 2, the packet security apparatus 100 includes a first transmitting unit 110, a packet feature detecting unit 130, a security level determining unit 150, a security packet generating unit 170, a second transmitting unit 190, a security policy table 120, and a security tool database 140.

The first transmitting unit 110 receives the packet transmitted from an external device. In an embodiment of the present invention, the packet should comprise feature information of the packet of interest. The feature information can include, for example, a destination address of the packet (i.e., EP address), a transfer protocol of the packet, a packet size, an application for the packet, a designated security level predefined for the packet, a recommended security level for the packet, a device category for the packet, and a packet category.

The first transmitter 110 transmits the received packet to the packet feature detecting unit 130, and the packet feature detecting unit 130 detects the feature of the packet of interest from the information contained in the transferred packet. The packet feature detected by the packet feature detecting unit 130 is transmitted to the security level determining unit 150.

The security level determining unit 150 determines the security level which is a security level of the packet based on the packet feature transmitted from the packet feature detecting unit 130. When the security level determining unit 150 determines the security level based on the packet feature of interest, it utilizes a security policy table 120 stored in the packet-security apparatus 100.

One example of the security policy table stored in the packet-security apparatus according to the present invention is shown in Table 1.

TABLE 1

| IP Address | Device Category | Application | Packet Size | Transfer Protocol | Packet Category | Security Level |
|---|---|---|---|---|---|---|
| 165.132.49.5 | Computer | Every | <thres1 | TCP/IP | Control | 2 |
| | | Word Processor | thres1 << thres2 | TCP/IP | Data | 3 |
| | | Media Player | thres2 < | IEEE1394, RTP | Entertainment | 3 |
| 165.132.49.25 | Refrigerator | — | <thres1 | TCP/IP | Control | 2 |
| | | — | thres1 << thres2 | TCP/IP | Etc. | 2 |

For example, if the destination IP address of the packet is 165.132.49.5, the device category is a computer, the application program that will use the packet is a word processor, a message size is less than a threshold (e.g., thres2), the transfer protocol used with the product is IEEE1394, the category of the packet is "entertainment," and the security level, which the determining unit 150 will determine, is a security level of 3. In case the feature information of the detected packet contains more than one feature, the determination of the security level of the packet is implemented by taking steps corresponding to each feature.

Specifically, the security level determining unit 150 determines the security level of the packet of interest based on the packet features transferred from the packet feature detecting unit 130 and the security policy table 120. If information about the designated security level, predefined for the packet of interest, is contained in the packet feature information, the security level may be determined.

The security level determining unit 150 transmits the information about the security level determined for the packet of interest to the security packet generating unit 170. The security packet generating unit 170 generates the security packet based on the security level of the packet of interest transferred from security level determining unit 150.

More specifically, the security packet generator 170 determines the security function to be applied to the packet by referencing a mapping table of the security function, according to the security level determined by the security level determining unit 150.

The security function mapping table maps and stores the security function, a security algorithm, and a key size, which are applied to the packet according to a security level, as shown in Table 2.

TABLE 2

| Security Level | Security Function | Algorithm | Key Size | Remarks |
|---|---|---|---|---|
| 0 | Nothing | | — | |
| 1 | User Auth. | hash(SHA-1) | — | |
| | Mess Auth. | keyed hash(HMAC) | 128 | |
| 2 | Mess Auth. | keyed hash(HMAC) | 128 | Default level |
| 3 | Encryption | Block Cipher (AES) | 128 | |
| 4 | Signature/ Encryption | Public Key (RSA) | 1024 | |
| | | Public Key (ECC) | 160 | |

For example, in the case where the security level determined by the security level determining unit 150 is security level 3, the security packet generating unit 170 determines the packet is encrypted by use of a block cipher (AES) algorithm. The security packet generating unit 170 then retrieves a security tool, such as an algorithm or a key in the security tool database 140, to be applied to the packet according to the determined, security function, thereby generating the packet with the security function applied to it.

If the algorithm corresponding to the determined security level does not exist in the security function mapping table, the security packet generating unit 170 may determine a substitute algorithm which can be applied to the determined security level. In this case, when the substitute algorithm is determined, it may be determined as an algorithm corresponding to a security level higher or lower by one increment. Alternatively, the security packet generating unit 170 may determine an algorithm nearest to the security level determined by the security level determining unit 150, and retrieves the algorithm from the security tool database 140 and applies it to the packet, thereby generating the packet applied with the security function.

A method of retrieving the algorithm nearest to the security level will now be described with reference to Table 3.

TABLE 3

| Security Level | Home Device, Key | Algorithm |
|---|---|---|
| 2 | 165.132.49.5, 128 bits | AES |
| | 165.132.49.5, — | — |
| | 165.132.49.4, 128 bits | DES |

As seen from Table 3, if the packet is to be transmitted to the home device having the IP address of 165.132.49.25, than the DES algorithm is applied to the packet because the IP address (165.132.49.25) of the home device is closest to IP address (165.132.49.4) in Table 3 which is associated with the DES algorithm.

Also, if an algorithm corresponding to a specific security level in the security function mapping table does not exist in the security tool database 140, the security packet generating unit may set a security tool as an algorithm corresponding to the security level of interest. Specifically, if the algorithm which is a security tool to be applied to the packet of interest is not retrieved from the security tool database 140, the security packet generating unit 170 starts a security process according to a conventional method, and applies the security function to the packet based on the set security tool.

In case the determined algorithm is not suitable for a destination device of a packet, for example, the determined algorithm is not used by the destination device of the packet or elements (i.e., memory, CPU, and so forth) required to use the algorithm of interest in the destination device are not sufficient, the security packet generating unit 170 may set a new algorithm suitable for the destination device of the packet.

In setting the new algorithm, the algorithm which is a security tool stored in the destination device of the packet may be set. For example, in case the destination device is a device such as a sensor, the existing security tool may be applied.

The security packet generating unit 170 transmits the generated security packet to the second transmitting unit 190, and the second transmitting unit 190 transmits the security packet to the destination device from the security packet generating unit 170.

FIG. 3 is a flowchart illustrating a packet security method according to an embodiment of the present invention.

Reference to FIGS. 2 and 3 will be made in explaining the packet security method. The packet security apparatus 100 identifies whether a packet is received from the external device. In the present embodiment of the present invention, the packet security apparatus 100 may implement security for packets used within the packet security apparatus 100, as well as implementing security for packets received from an external device.

When the packet is transmitted to the external device (S200) (or it is required to implement the security for the packet in the packet security apparatus 100), the packet feature detecting unit 130 detects a feature of the packet of interest (S205). When the security level is determined on the basis of the detected packet feature, the security level determining unit 150 identifies whether there is a security level designated for the packet of interest (S210). Information about the designated security level may be contained in the packet in a type of security sensitivity flag.

If the packet has a designated security level, the security level determining unit 150 determines the security level as the security level of interest is designated for the packet (S215). If there is no designated security level, the security level determining unit 150 determines the security level for the packet by use of the feature information on the packet detected by the packet feature detecting unit 130 and the security policy table 120 (S220).

Next, the security packet generating unit 170 determines the security tool, such as an algorithm to be used, according to the security level determined by the security level determining unit 150 (S225). It then determines whether tools corresponding to the determined algorithm exist in the security tool database 140 (S230).

If tools corresponding to the determined algorithm do not exist in the security tool database 140, a substitute algorithm is determined (S235). If tools corresponding to the determined algorithm exist in the security tool database 140 or if a substitute algorithm is determined, then it is determined whether the determined or substitute algorithm can be applied to the destination device (S240).

In case the determined algorithm can be not applied to the destination device, the security packet generating unit 170 sets a new algorithm (S245).

In case the determined algorithm can be applied to the destination device and the new algorithm is set, the security packet generating unit 170 generates the security packet by use of the security tools, such as the algorithm of interest (S250), and transmits the generated security packet to the destination device through the second transmitting unit 190 (S255).

As described above, the prior art applies the security function in unit of a device, but the present invention adaptively applies the security function according to a feature of the packet to be transmitted, and thus, flexibility can be provided in the application of the security function to achieve an efficient use of resources.

Also, the determination of the security level for the transmitted data packet, the selection of the security function, and the application of the security function are automatically implemented at the application end, thereby easily applying the security function to the transmitted data packet while minimizing intervention at the user's side.

The foregoing embodiment and advantages are merely exemplary and are not to be construed as limiting the present invention. The present teaching can be readily applied to other types of apparatuses. Also, the description of the embodiments of the present invention is intended to be illustrative, and not to limit the scope of the claims, and many alternatives, modifications, and variations will be apparent to those skilled in the art.

What is claimed is:

1. A packet security method of a packet security apparatus comprising:
    detecting, by the packet security apparatus, a plurality of features of a packet to be transmitted;
    determining, by the packet security apparatus, whether the detected plurality of features include a designated security level for the packet;
    determining, by the packet security apparatus, a security level of the packet according to the designated security level if it is determined that the detected plurality of features include the designated security level;
    determining, by the packet security apparatus, the security level of the packet according to the detected plurality of features if it is determined that the detected plurality of features do include the designated security level, wherein the security level of the packet is determined based on taking steps according to each of the plurality of features if it is determined that the detected plurality of features do not include the designated security level;
    determining, by the packet security apparatus, whether a first algorithm corresponding to the determined security level of the packet exists in a security tool database; and
    generating, by the packet security apparatus, a security packet according to the determined security level,
    wherein the security packet is generated using a second algorithm corresponding to a security level nearest to the determined security level when the first algorithm corresponding to the determined security level does not exist in the security tool database,
    wherein the plurality of features of the packet include at least one of a destination address of the packet, a transfer protocol of the packet, a packet size, and the designated security level for the packet.

2. The packet security method as claimed in claim 1, further comprising determining the first or the second algorithm to encrypt the packet according to the determined security level.

3. The packet security method as claimed in claim 1, further comprising determining the security level of the packet according to a predefined security policy if one or more predefined security policies exists.

4. The packet security method as claimed in claim 1, wherein the security level is adjustable.

5. The packet security method as claimed in claim 2, further comprising setting a new algorithm suitable for a destination device of the packet if the determined first or second algorithm is not suitable for the destination device of the packet.

6. A packet security apparatus comprising:
    a packet feature detecting unit configured to detect a plurality of features of a packet to be transmitted;
    a security level determining unit configured to determine whether the detected plurality of features include a designated security level for the packet, to determine a security level of the packet according to the designated security level if it is determined that the detected plurality of features include the designated security level, and to determine the security level of the packet according to the detected plurality of features if it is determined that the detected plurality of features do not include the designated security level, wherein the security level of the packet is determined based on taking steps according to each of the plurality of features if it is determined that the detected plurality of features do not include the designated security level; and
    a security packet generating unit configured to determine whether a first algorithm corresponding to the determined security level exists in a security tool database, and to generate a security packet according to the determined security level,
    wherein the security packet is generated using a second algorithm corresponding to a security level nearest to the determined security level when the first algorithm corresponding to the determined security level does not exist in the security tool database,
    wherein the plurality of features of the packet include at least one of a destination address of the packet, a transfer protocol of the packet, a packet size, and the designated security level for the packet.

7. The packet security apparatus as claimed in claim 6, wherein the security packet generating unit determines the first or the second algorithm used to encrypt the packet according to the determined security level.

8. The packet security apparatus as claimed in claim 6, wherein if a predefined security policy exists for the packet security apparatus, the security level of the packet is determined according to the predefined security policy.

9. The packet security apparatus as claimed in claim 6, wherein the security level is adjustable.

10. The packet security apparatus as claimed in claim 7, wherein if the determined first or second algorithm is not suitable for a destination device of the packet, the security packet generating unit sets a new algorithm suitable for the destination device of the packet.

11. The packet security apparatus as claimed in claim 8, further comprising a security policy table coupled to the security level determining unit, wherein the predefined security policy is contained within the security policy table.

12. A packet security method of a packet security apparatus comprising:
  detecting, by the packet security apparatus, a plurality of features of a packet to be transmitted;
  determining, by the packet security apparatus, whether the detected plurality of features include a designated security level for the packet;
  determining, by the packet security apparatus, a security level of the packet according to the designated security level if it is determined that the detected plurality of features include the designated security level;
  determining, by the packet security apparatus, the security level of the packet according to the detected plurality of features if it is determined that the detected plurality of features do not include the designated security level, wherein the security level of the packet is determined based on taking steps according to each of the plurality of features if it is determined that the detected plurality of features do not include the designated security level;
  determining, by the packet security apparatus, whether a first algorithm corresponding to the determined security level of the packet exists in a security tool database; and
  generating, by the packet security apparatus, a security packet according to the determined security level,
  wherein the security packet is generated using a substitute algorithm corresponding to another security level higher or lower by one increment than the determined security level when the first algorithm corresponding to the determined security level does not exist in security tool database, and
  wherein the plurality of features of the packet include at least one of a destination address of the packet, a transfer protocol of the packet, a packet size, and the designated security level for the packet.

13. A packet security apparatus comprising:
  a packet feature detecting unit configured to detect a plurality of features of a packet to be transmitted;
  a security level determining unit configured to determine whether the detected plurality of features include a designated security level for the packet, to determine a security level of the packet according to the designated security level if it is determined that the detected plurality of features include the designated security level, and to determine the security level of the packet according to the detected plurality of features if it is determined that the detected plurality of features do not include the designated security level, wherein the security level of the packet is determined based on taking steps according to each of the plurality of features if it is determined that the detected plurality of features do not include the designated security level; and
  a security packet generating unit configured to determine whether a first algorithm corresponding to the determined security level exists in a security tool database, and to generate a security packet according to the determined security level,
  wherein the security packet is generated using a substitute algorithm corresponding to another security level higher or lower by one increment than the determined security level when the first algorithm corresponding to the determined security level does not exist in the security tool database, and
  wherein the plurality of features of the packet include at least one of a destination address of the packet, a transfer protocol of the packet, a packet size, and the designated security level for the packet.

* * * * *